(12) United States Patent
Lee

(10) Patent No.: US 8,149,229 B2
(45) Date of Patent: Apr. 3, 2012

(54) IMAGE APPARATUS FOR PROCESSING 3D IMAGES AND METHOD OF CONTROLLING THE SAME

(75) Inventor: Eun-bae Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 977 days.

(21) Appl. No.: 11/769,412

(22) Filed: Jun. 27, 2007

(65) Prior Publication Data

US 2008/0170274 A1 Jul. 17, 2008

(30) Foreign Application Priority Data

Jan. 12, 2007 (KR) .................. 10-2007-0004010

(51) Int. Cl.
*G09G 5/00* (2006.01)

(52) U.S. Cl. .................. 345/204; 345/1.2; 345/2.3

(58) Field of Classification Search .............. 345/1.2, 345/2.3, 6–9, 204, 419; 359/462; 348/43–60; 349/15
See application file for complete search history.

(56) References Cited

U.S. PATENT DOCUMENTS

| | | | | |
|---|---|---|---|---|
| 5,867,141 A * | 2/1999 | Asada et al. | ............. | 345/100 |
| 6,473,077 B1 * | 10/2002 | Takenaka et al. | ............. | 345/209 |
| 2003/0030607 A1 * | 2/2003 | Kitagawa et al. | ............. | 345/87 |
| 2004/0183792 A1 * | 9/2004 | Takada et al. | ............. | 345/204 |
| 2004/0189583 A1 * | 9/2004 | Park et al. | ............. | 345/100 |
| 2004/0246242 A1 * | 12/2004 | Sasaki | ............. | 345/204 |
| 2004/0263698 A1 * | 12/2004 | Nam et al. | ............. | 349/6 |
| 2005/0128584 A1 * | 6/2005 | Shulman et al. | ............. | 359/462 |
| 2005/0259064 A1 * | 11/2005 | Sugino et al. | ............. | 345/102 |
| 2006/0209057 A1 * | 9/2006 | Damera-Venkata et al. | . | 345/204 |
| 2006/0262077 A1 * | 11/2006 | Terasaka | ............. | 345/102 |
| 2008/0036696 A1 * | 2/2008 | Slavenburg et al. | ............. | 345/8 |

* cited by examiner

*Primary Examiner* — Amare Mengistu
*Assistant Examiner* — Premal Patel
(74) *Attorney, Agent, or Firm* — Sughrue Mion, PLLC

(57) ABSTRACT

An image apparatus for processing 3D images and a method for controlling thereof are provided. The apparatus includes: a display unit onto which data is scanned; and a display driver which makes left frame image data and right frame image data be alternately scanned onto the display unit and makes removal data for removing the left frame image data or the right frame image data be scanned onto the display unit between the left image frame data and the right image frame data. Therefore, while an image is being scanned, a residual image of the previous frame image is not displayed.

16 Claims, 3 Drawing Sheets

FIRST RIGHT LINE DATA
SECOND RIGHT LINE DATA
k-TH RIGHT LINE DATA
BLACK DATA

IMAGE APPARATUS FOR PROCESSING 3D IMAGES AND METHOD OF CONTROLLING THE SAME

CROSS-REFERENCE TO RELATED APPLICATIONS

This application claims priority under 35 U.S.C. §119 from Korean Patent Application No. 10-2007-0004010, filed on Jan. 12, 2007 in the Korean Intellectual Property Office, the disclosure of which is incorporated herein by reference in its entirety.

BACKGROUND OF THE INVENTION

1. Field of the Invention

Methods and apparatuses consistent with the present invention relate to an image apparatus for processing 3D images.

2. Description of the Related Art

Objects of 3D images are perceived as though actually in a 3D space. 3D images can be acquired by means of a stereo camera having two lenses. Two images of the same object taken through two lenses are combined with each other and the combined image is stored in a frame. Frame images taken through the right one of the two lenses are referred to as right frame images and frame images taken through the left one of the two lenses are referred to as left frame images. The right frame images and the left frame images are alternately displayed, thereby realizing 3D images.

As described above, in order for a right frame image and a left frame image to be combined to display a 3D image, an image apparatus should scan the right frame image in a short time and then scan the left frame image. However, during the scanning of the left frame image, a previous image or the right frame image is still displayed in a region where a portion of the left frame image having not been scanned will be displayed. For this reason, images may not be clearly displayed.

SUMMARY OF THE INVENTION

Exemplary embodiments of the present invention overcome the above disadvantage and other disadvantages not described above. Also, the present invention is not required to overcome the disadvantages described above, and an exemplary embodiment of the present invention may not overcome any of the problems described above.

The present invention provides an image apparatus and a method for controlling thereof, in which, when a 3D image is scanned onto a display unit, a frame image is scanned and then removal data for removing the scanned frame image is scanned.

According to an aspect of the present invention, there is provided an image apparatus comprising: a display unit onto which data is scanned; and a display driver which makes left frame image data and right frame image data be alternately scanned onto the display unit and makes removal data for removing the left frame image data or the right frame image data be scanned onto the display unit during a period from a time point when the scanning of the left frame image data is completed to a time point when the scanning of the right frame image data starts or during a period from a time point when the scanning of the right frame image data is completed to a time point when the scanning of the left frame image data starts.

The display driver may make the left frame image data and the right frame image data be sequentially scanned and make the removal data be collectively scanned.

Further, the display driver may make the removal data be scanned during a vertical blank period of a vertical sync signal.

The image apparatus may further comprise a storage unit, which stores the removal data. The display driver may make the removal data having been stored in the storage unit be scanned onto the display unit.

In the image apparatus, the removal data may be black data or gray data.

Further, while the display driver is sequentially scanning the left frame image data, the removal data may still be displayed in a region where a portion of the left frame image having not been scanned will be displayed.

According to another aspect of the present invention, there is provided a method of controlling an image apparatus, the method comprising: scanning left frame image data; scanning removal data for removing the scanned left frame image data; scanning right frame image data; and scanning removal data for removing the scanned right frame image data.

In the scanning of the left frame image data, the left frame image data may be sequentially scanned. Further, in the scanning of the removal data for removing the scanned left frame image data, the removal data for removing the scanned left frame image data may be collectively scanned. Furthermore, in the scanning of the right frame image data, the right frame image data may be sequentially scanned. In addition, in the scanning of the removal data for removing the scanned right frame image data, the removal data for removing the scanned right frame image data may be collectively scanned.

The method may further comprise reading the removal data having been stored. In the scanning of the removal data for removing the scanned left frame image data and the scanning of the removal data for removing the scanned right frame image data, the read removal data may be scanned.

The method may further comprise the removal data being scanned during a vertical blank period of a vertical sync signal.

Further, the removal data may be black data or gray data.

Furthermore, in the scanning of the right frame image data, while the right frame image data is sequentially being scanning, the removal data for removing the left frame image data may be still displayed in a region where a portion of the right frame image having not been scanned will be displayed.

BRIEF DESCRIPTION OF THE DRAWINGS

The above and/or other aspects and advantages of the present invention will become more apparent from the following detailed description of exemplary embodiments with reference to the accompanying drawings, in which.

DETAILED DESCRIPTION OF EXEMPLARY EMBODIMENTS OF THE PRESENT INVENTION

Figure 1:
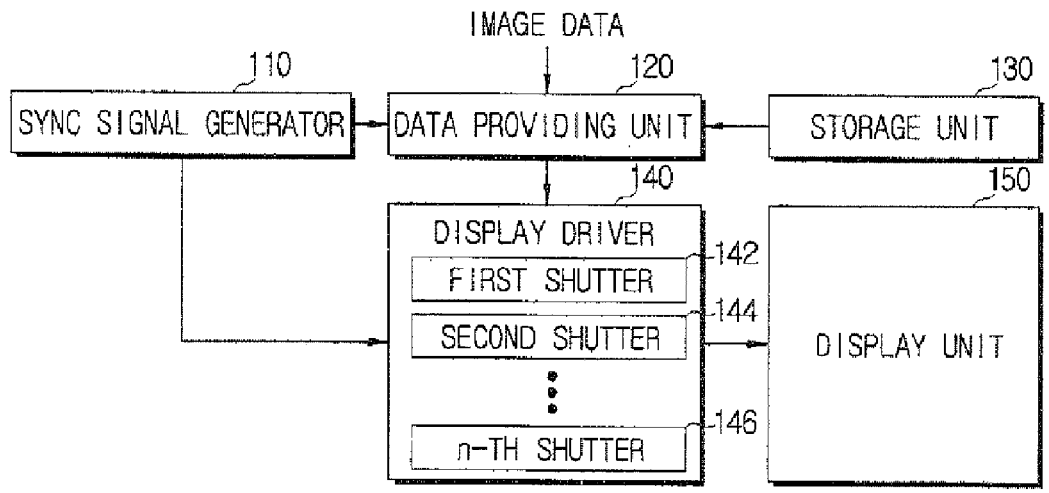
FIG. 1 is a block diagram illustrating an image apparatus according to an exemplary embodiment of the present invention.

Exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Thus, it is apparent that the present invention can be carried out without those specifically defined matters. Additionally, well-known functions or constructions are not described in detail since they would obscure the invention with unnecessary detail.

FIG. 1 is a block diagram of an image apparatus according to an exemplary embodiment of the present invention. Referring to FIG. 1, an image apparatus comprises a sync signal generator 110, a data providing unit 120, a storage unit 130, a display driver 140, and a display unit 150. The display driver 140 and the display unit 150 may be components of a display panel.

The sync signal generator 110 generates a vertical sync signal and a horizontal sync signal and supplies the vertical and horizontal sync signals to the data providing unit 120 and the display driver 140. The vertical sync signal becomes a reference of frame image data and the horizontal sync signal becomes a reference of line data. There may exist, in one vertical active period of the vertical sync signal, N number of horizontal active periods of the horizontal sync signal.

The data providing unit 120 receives frame image data composed of N number of line data and supplies the frame image data to the display driver 140. The frame image data may be data externally obtained. Further, the data providing unit 120 reads data having been stored in the storage unit 130 and supplies the read data to the display driver 140. The data having been stored in the storage unit 130 may be removal data for image removal, such as black data or gray data.

The data providing unit 120 supplies the image data or the removal data (for example, black data) to the display driver 140 on the basis of the vertical sync signal supplied by the sync signal generator 110. In particular, in a vertical active period of the vertical sync signal, the data providing unit 120 supplies the image data to the display driver 140. In contrast, in a vertical blank period, the data providing unit 120 supplies the black data to the display driver 140.

The storage unit 130 stores the removal data. The data providing unit 120 reads the removal data from the storage unit 130 every vertical blank period.

The display driver 140 makes the data supplied from the data providing unit 120 be scanned onto the display unit 150. The display driver 140 may have the same number of shutters as the number of lines of the display unit 150. For convenience of explanation, it is assumed that the display driver 140 has N number of shutters. During a horizontal active period of the horizontal sync signal, the display driver 140 receives the frame image data from the data providing unit 120 and uses the shutters such that the line data of the frame image data is scanned onto the display unit 150.

Specifically, during a first horizontal active period, the display driver 140 opens only a first shutter 142 such that first line data of the frame image data is scanned onto the display unit 150. Then, during a second horizontal active period, the display driver 140 opens only a second shutter 144 such that second line data of the frame image data is scanned onto the display unit 150. In this way, the display driver 140 sequentially scans the image data line-by-line in synchronization with the horizontal sync signal.

Further, during a vertical blank period, the display driver 140 receives the black data from the data providing unit 120 and opens all of the shutters, that is, N number of shutters such that the black data is collectively scanned onto the display unit 150.

As described above, the display driver 140 makes the frame image data or the black data be scanned onto the display unit 150 and the frame image data or the black data is displayed on the display unit 150.

Figure 2:
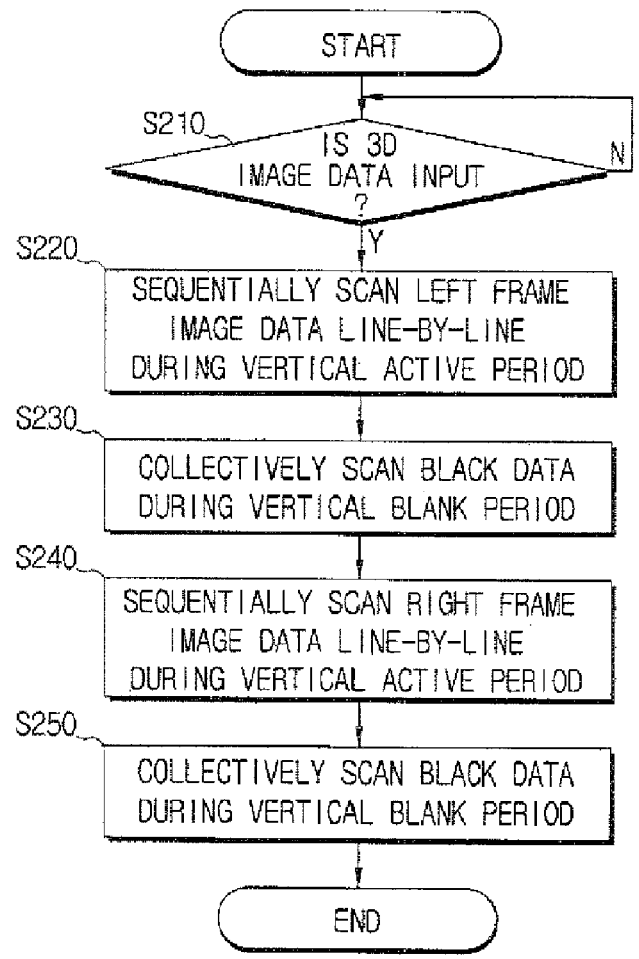
FIG. 2 is a flowchart illustrating a 3D image scanning process according to the exemplary embodiment of the present invention.
Figure 3A:
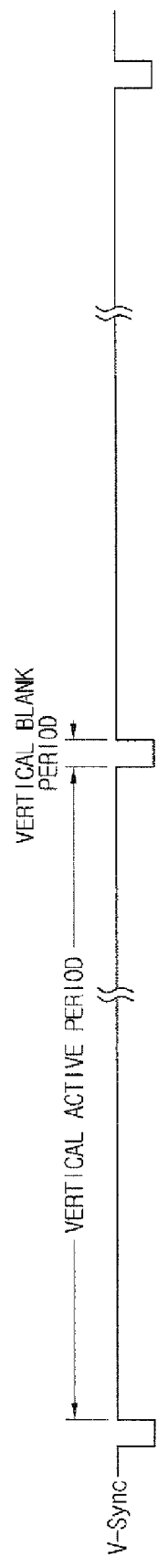
FIG. 3A and FIG. 3B are timing charts illustrating the 3D image scanning process.
Figure 3B:
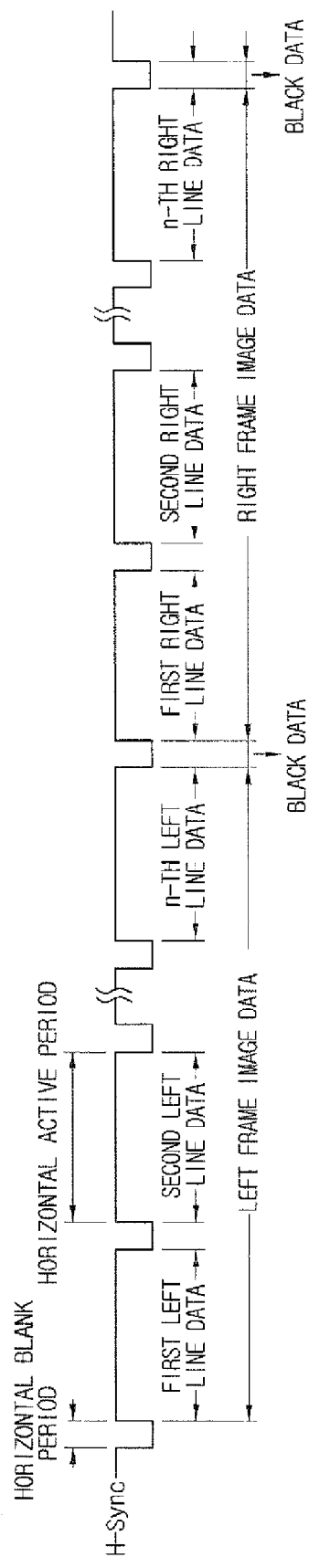

The operation of the image apparatus shown in FIG. 1 will now be described in detail with reference to FIGS. 2, 3A and 3B. FIG. 2 is a flowchart illustrating a 3D image scanning process according to an exemplary embodiment of the present invention. FIG. 3A and FIG. 3B are timing charts illustrating the 3D image scanning process.

When 3D image data is input (Yes in S210), during a vertical active period, the display driver 140 makes left frame image data of the 3D image data be sequentially (line-by-line) scanned onto the display unit 150 (S220). As shown in FIG. 3A, the sync signal generator 110 generates a signal level indicating that a vertical active period of the vertical sync signal starts and supplies the generated signal level to the data providing unit 120 and the display driver 140. As shown in FIG. 3B, the sync signal generator 110 generates a signal level indicating that a horizontal active period of the horizontal sync signal starts and supplies the generated signal level to the data providing unit 120 and the display driver 140. Then, the left frame image data starts to be scanned.

Specifically, when receiving the signal level indicating that a vertical active period of the vertical sync signal starts, the data providing unit 120 supplies the left frame image data to the display driver 140.

Before receiving the signal level indicating that a horizontal blank period of the horizontal sync signal starts, the display driver 140 opens the first shutter 142 so as to complete the scanning of the first left line data. Then, if receiving the signal level indicating that a horizontal blank period starts, the display driver 140 closes the first shutter 142.

During the vertical active period, if the sync signal generator 110 generates again the signal level indicating that a horizontal active period starts and supplies the generated signal level to the display driver 140, the display driver 140 opens the second shutter 144 such that the second left line data is scanned onto the display unit 150. Then, if receiving the signal level indicating that a horizontal blank period starts, the display driver 140 closes the second shutter 144.

As described above, the display driver 140 sequentially opens shutters corresponding to line data every horizontal active period such that the line data is scanned. In this way, the left frame image data is scanned.

During a vertical blank period, the display driver 140 makes the black data be collectively scanned onto the display unit 150 (S230). Specifically, the data providing unit 120 and the display driver 140 determine whether the signal level indicating that a vertical blank period starts is supplied. The vertical blank period of the vertical sync signal indicates that the scanning of the frame image data has been completed.

If receiving the signal level indicating that a vertical blank period starts, the data providing unit 120 reads the black data from the storage unit 130 and supplies the read black data to the display driver 140. Then, the display driver 140 opens all of the shutters provided in the display driver 140, that is, N number of shutters such that the black data is collectively scanned.

The vertical blank period is shorter than the vertical active period and thus it is effective to open all of the shutters such that the black data is collectively scanned. This is why the display driver 140 collectively scans the black data during the vertical blank period. Also, since the black data is scanned onto an entire screen of the display unit, it is unprofitable to scan the black data line-by-line. In order to scan the black data, the shutters may be individually opened.

The scanning of the black data in S230 causes the left frame image data displayed on the display unit 150 to be removed.

During the next vertical active period, the display driver 140 makes right frame image data be sequentially (line-by-line) scanned onto the display unit 150 (S240). A method of scanning the right frame image data is the same as the method of scanning the left frame image data and thus a description thereof will be omitted.

Then, during the next vertical blank period, the display driver 140 makes the black data be collectively scanned onto the display unit 150 (S250).

As explained above, since the black data is scanned during a vertical blank period so as to remove image data scanned, it is possible to prevent a portion of the scanned image data from being displayed in a process of scanning the next image data.

Figure 4:
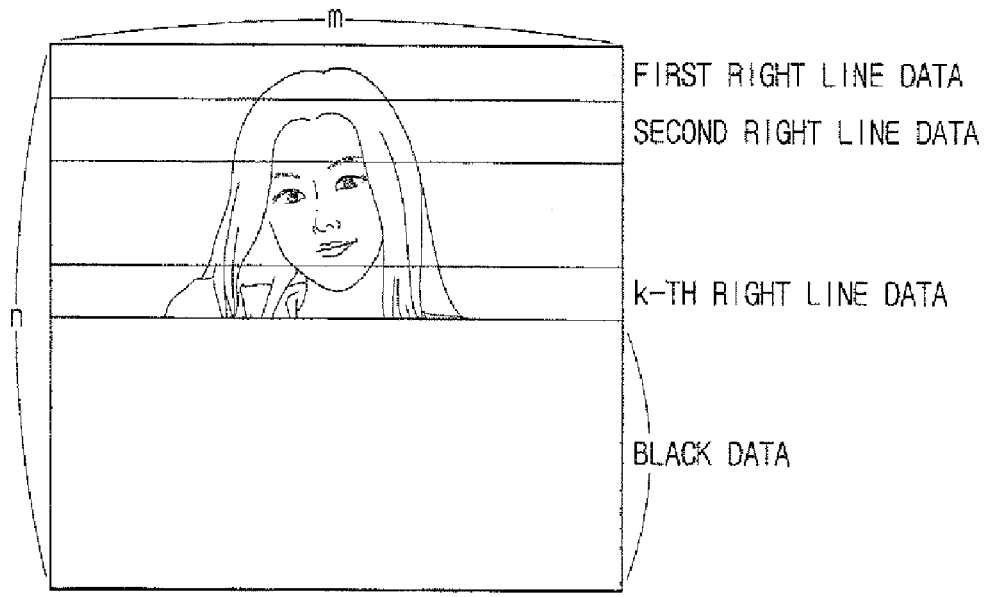
FIG. 4 is a view illustrating an image displayed during a right frame image scanning process of a 3D image scanning process.

The above-mentioned operation will be described in more detail with reference to FIG. 4. FIG. 4 is a view illustrating an image displayed during a right frame image scanning process of a 3D image scanning process. Since the black data is scanned during the vertical blank period after left frame image data is scanned, the left frame image data is not displayed. Then, the right frame image data is sequentially (line-by-line) scanned from the top of the screen.

As shown in FIG. 4, at the moment when the display driver 140 scans k-th right line data, image data corresponding to the first to k-th right line data and black data corresponding to the remaining lines is displayed.

For this reason, the left frame image is not displayed while the right frame image is being displayed. Therefore, it is possible to prevent residual images and thus a user can enjoy 3D images more clearly.

In the above-mentioned exemplary embodiment, the data providing unit 120 supplies image data to the display driver 140 frame-by-frame, and the display driver 140 makes the image data be scanned onto the display unit 150 line-by-line. However, the present invention is not limited thereto. It is apparent that the data providing unit 120 may supply image data to the display driver 140 line-by-line and the display driver 140 may make the supplied image data be scanned onto the display unit 150 appropriately.

A second exemplary embodiment of the present invention will now be described with reference to FIGS. 5 and 6.

Figure 5:
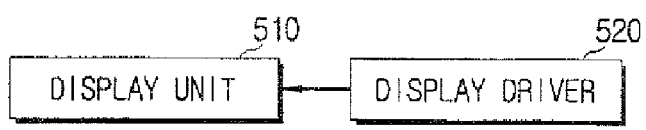
FIG. 5 is a block diagram illustrating an image apparatus according to a second exemplary embodiment of the present invention.

As shown in FIG. 5, an image apparatus according to the second exemplary embodiment of the present invention includes a display unit 510 and a display driver 520. The display driver 520 makes data be scanned. Specifically, the display driver 520 makes left frame image data and right frame image data be alternately scanned onto the display unit and makes removal data for removing the left frame image data or the right frame image data be scanned onto the display unit during a period from a time point when the scanning of the left frame image data is completed to a time point when the scanning of the right frame image data starts or during a period from a time point when the scanning of the right frame image data is completed to a time point when the scanning of the left frame image data starts.

Figure 6:
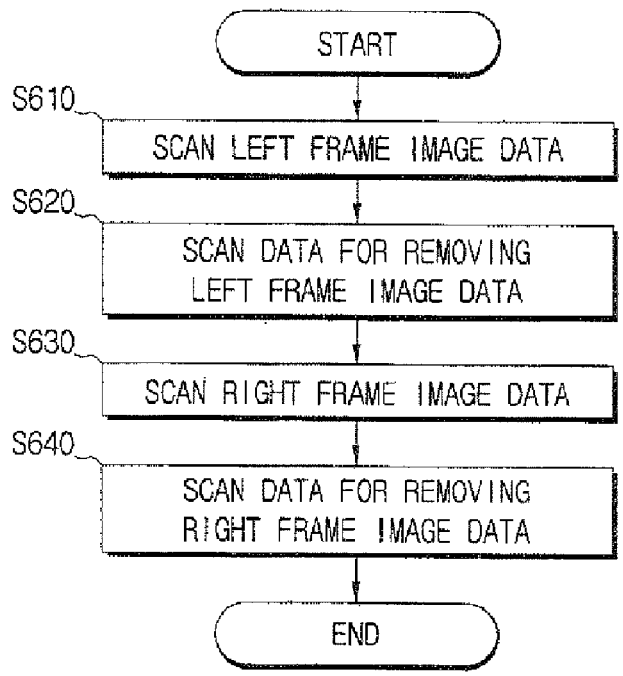
FIG. 6 is a flowchart illustrating a 3D image scanning process according to the second exemplary embodiment of the present invention.

According to a data scanning method shown in FIG. 6, the display driver 520 scans the left frame image data (S610), scans data for removing the scanned left frame image data (S620), and scans the right frame image data (S630). Then, the display driver 520 scans data for removing the scanned right frame image data (S640).

In the above-mentioned process of scanning 3D images frame-by-frame, frame image data is scanned and then data for removing the scanned frame image data is scanned. Therefore, it is possible to prevent residual images.

As described above, in the exemplary embodiments of the present invention, a frame image is scanned and then data for removing the scanned frame image is scanned. Therefore, a residual image of the scanned frame image is not displayed and thus 3D images can be displayed more clearly.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image apparatus comprising:
   a display unit onto which left frame image data and right frame image data are alternately scanned, wherein each of the left frame image data and the right frame image data comprise a plurality of line data; and
   a display driver which makes line data of the left frame image data and line data of the right frame image data be sequentially scanned onto each line of the display unit and makes removal data for removing the left frame image data and the right frame image data be collectively scanned onto every line of the display unit during a period between scanning the left frame image data and the right frame image data;
   wherein the display driver comprises a plurality of shutters and the display driver opens the plurality of shutters so that the removal data is collectively scanned on every line of the display unit.

2. The apparatus as claimed in claim 1, wherein the display driver makes the removal data be scanned during a vertical blank period of a vertical sync signal.

3. The apparatus as claimed in claim 1, further comprising:
   a storage unit which stores the removal data,
   wherein the display driver makes the removal data having been stored in the storage unit be scanned onto the display unit.

4. The apparatus as claimed in claim 1, wherein the removal data is black data or gray data.

5. The apparatus as claimed in claim 1, wherein the a plurality of shutters corresponds to a plurality of line data of the left frame image data or the right frame image data.

6. The apparatus as claimed in claim 5, wherein the display driver sequentially opens the plurality of shutters so that the line data of the left frame image data and the line data of the right frame image data are sequentially scanned onto each line of the display unit.

7. The apparatus as claimed in claim 6, wherein the display driver opens only a shutter which corresponds to line data of the left frame image data and line data of the right frame image data respectively, so that the line data is scanned onto a corresponding line of the display unit.

8. The apparatus as claimed in claim 1, wherein the display driver makes the removal data be scanned on a display line where the left frame image data or the right frame image data is not scanned while the display driver makes the line data of the left frame image data or the line data of the right frame image data be sequentially scanned.

9. A method of controlling an image apparatus, the method comprising:

sequentially scanning line data of left frame image data, which comprises a plurality of line data, onto each line of a display unit;

collectively scanning removal data for removing the scanned left frame image data on every line of the display unit;

sequentially scanning line data of right frame image data, which comprises a plurality of line data, onto each line of the display unit; and collectively scanning removal data for removing the scanned right frame image data on every line of the display unit wherein the collectively scanning removal data for removing the scanned left frame image data and the collectively scanning removal data for removing the scanned right frame image data comprises opening a plurality of shutters so that the removal data is collectively scanned onto every line of the display unit.

10. The method as claimed in claim 9, further comprising: reading the removal data having been stored, wherein, in the scanning of the removal data for removing the scanned left frame image data and the scanning of the removal data for removing the scanned right frame image data, the read removal data is scanned.

11. The method as claimed in claim 9, wherein the removal data is scanned during a vertical blank period of a vertical sync signal.

12. The method as claimed in claim 9, wherein the removal data is black data or gray data.

13. The method as claimed in claim 9, wherein the sequentially scanning the line data of the left frame image data comprises sequentially opening a plurality of shutters which correspond to the plurality of line data of the left frame image data, so that the line data of the left frame image data is sequentially scanned onto each line of the display unit; and the sequentially scanning the line data of the right frame image data comprises sequentially opening a plurality of shutters which correspond to the plurality of line data of the right frame image data so that the line data of the right frame image data is sequentially scanned onto each line of the display unit.

14. The method as claimed in claim 13, wherein the sequentially scanning the line data of the left frame image data further comprises opening only a shutter which corresponds to the line data of the left frame image data so that the line data is scanned onto a corresponding line of the display unit; and the sequentially scanning the line data of the right frame image data further comprises opening only a shutter which corresponds to the line data of the right frame image data so that the line data is scanned onto a corresponding line of the display unit.

15. The method as claimed in claim 9, wherein the plurality of shutters corresponds to the plurality of line data of the left frame image data or the right frame image data.

16. The method as claimed in claim 9, wherein the sequentially scanning the removal data for removing the scanned left frame image data and the sequentially scanning the removal data for removing the scanned right frame image data each comprise making the removal data be displayed in a region where the left frame image data or the right frame image data is not scanned while the line data of the left frame image data of the line data of the right frame image data is being sequentially scanned.

* * * * *